US011679991B2

(12) United States Patent
Li et al.

(10) Patent No.: US 11,679,991 B2
(45) Date of Patent: Jun. 20, 2023

(54) MULTIPHASE FERRITES AND COMPOSITES COMPRISING THE SAME

(71) Applicant: ROGERS CORPORATION, Chandler, AZ (US)

(72) Inventors: Qifan Li, Wuhan (CN); Yajie Chen, Brighton, MA (US)

(73) Assignee: ROGERS CORPORATION, Chandler, AZ (US)

(*) Notice: Subject to any disclaimer, the term of this patent is extended or adjusted under 35 U.S.C. 154(b) by 363 days.

(21) Appl. No.: 16/938,396

(22) Filed: Jul. 24, 2020

(65) Prior Publication Data

US 2021/0032121 A1  Feb. 4, 2021

Related U.S. Application Data

(60) Provisional application No. 62/880,278, filed on Jul. 30, 2019.

(51) Int. Cl.
*C01G 49/00* (2006.01)
*C08L 23/00* (2006.01)
(Continued)

(52) U.S. Cl.
CPC ............ *C01G 49/009* (2013.01); *C08L 23/00* (2013.01); *C08L 27/12* (2013.01); *C08L 61/16* (2013.01);
(Continued)

(58) Field of Classification Search
CPC ....... C01G 49/009; C08L 23/00; C08L 27/12; C08L 61/16; C08L 81/02; H01F 1/348;
(Continued)

(56) References Cited

U.S. PATENT DOCUMENTS 3,020,426 A   2/1962  Van Der Burgt
3,036,007 A   5/1962  Buykx et al.
(Continued)

FOREIGN PATENT DOCUMENTS

CN   101723654 A   6/2010
CN   102486655 A   6/2012
(Continued)

OTHER PUBLICATIONS

Dedi, Novrita Idayanti, Tony Kristiantoro, et al. "Magnetic properties of cobalt ferrite synthesized by mechanical alloying", May 15, 2018. AIP Conference Proceedings. (Year: 2018).*
(Continued)

*Primary Examiner* — Melissa S Swain
*Assistant Examiner* — Catriona M Corallo
(74) *Attorney, Agent, or Firm* — Cantor Colburn LLP (57) ABSTRACT

In an aspect, a multiphase ferrite comprises a $Co_2W$ phase that is optionally doped with Ru; a CFO phase having the formula $Me_r"Co_{1-r}Fe_{2+z}O_4$, wherein "Me" is at least one of Ni, Zn, or Mg, r is 0 to 0.5, and z is −0.5 to 6 0.5; and a CoRu-BaM phase having the formula $BaCo_{x+y}Ru_y Fe_{12-(2/3)x-2y}O_{19}$, wherein x is 0 to 2, y is 0.01 to 2; and the Ba can be partially replaced by at least one of Sr or Ca. In another aspect, a composite can comprise a polymer and the multiphase ferrite. In yet another aspect, a method of making a multiphase ferrite can comprise mixing and grinding a CoRu-BaM phase ferrite and a CFO phase ferrite to form a mixture; and sintering the mixture in an oxygen atmosphere to form the multiphase ferrite.

20 Claims, 3 Drawing Sheets

(51) Int. Cl.
    *C08L 27/12*     (2006.01)
    *C08L 61/16*     (2006.01)
    *C08L 81/02*     (2006.01)
    *H01F 1/34*     (2006.01)

(52) U.S. Cl.
    CPC .............. *C08L 81/02* (2013.01); *H01F 1/348* (2013.01); *C01P 2002/70* (2013.01); *C01P 2004/61* (2013.01); *C01P 2004/80* (2013.01); *C01P 2006/40* (2013.01); *C01P 2006/42* (2013.01)

(58) Field of Classification Search
    CPC .............. C01P 2002/70; C01P 2004/61; C01P 2004/80; C01P 2006/40; C01P 2006/42
    See application file for complete search history.

(56) References Cited

U.S. PATENT DOCUMENTS

| | | |
|---|---|---|
| 4,569,775 A | 2/1986 | Kubo et al. |
| 4,957,812 A | 9/1990 | Aoki et al. |
| 5,110,651 A | 5/1992 | Massard et al. |
| 5,494,749 A | 2/1996 | Kubo et al. |
| 5,591,276 A | 1/1997 | Yoshizawa et al. |
| 5,593,612 A | 1/1997 | Lubitz |
| 5,616,414 A | 4/1997 | Hopstock et al. |
| 6,071,430 A | 6/2000 | Lebourgeois et al. |
| 6,358,432 B1 | 3/2002 | Tomono et al. |
| 6,436,307 B1 | 8/2002 | Lebourgeois et al. |
| 6,736,990 B2 | 5/2004 | Aoki et al. |
| 7,348,374 B2 | 3/2008 | Martinazzo |
| 7,482,977 B2 | 1/2009 | Kuroda et al. |
| 8,305,281 B2 | 11/2012 | Suetsuna et al. |
| 8,758,721 B2 | 6/2014 | Hill |
| 9,596,755 B2 | 3/2017 | Sethumadhavan et al. |
| 10,071,421 B2 | 9/2018 | Suetsuna et al. |
| 10,090,088 B2 | 10/2018 | Suetsuna et al. |
| 10,468,169 B2 | 11/2019 | Chen et al. |
| 2003/0091841 A1 | 5/2003 | Marusawa |
| 2004/0069969 A1 | 4/2004 | Endo et al. |
| 2007/0231614 A1 | 10/2007 | Kondo et al. |
| 2009/0057606 A1 | 3/2009 | Tada et al. |
| 2009/0266604 A1 | 10/2009 | Tetsuji |
| 2009/0297432 A1 | 12/2009 | Hill |
| 2010/0000769 A1 | 1/2010 | Ohmi et al. |
| 2010/0060539 A1 | 3/2010 | Suetsuna et al. |
| 2010/0068512 A1 | 3/2010 | Imaoka et al. |
| 2011/0147643 A1 | 6/2011 | Ryou et al. |
| 2012/0049100 A1 | 3/2012 | Yonetsu et al. |
| 2012/0068103 A1 | 3/2012 | Hill et al. |
| 2012/0085963 A1 | 4/2012 | An et al. |
| 2012/0229354 A1 | 9/2012 | Ishikura et al. |
| 2013/0115160 A1 | 5/2013 | Hill et al. |
| 2013/0342414 A1 | 12/2013 | Hong et al. |
| 2014/0264145 A1 | 9/2014 | Ray et al. |
| 2014/0291571 A1 | 10/2014 | Hirose |
| 2014/0346387 A1 | 11/2014 | Hill et al. |
| 2015/0310971 A1 | 10/2015 | Kmetz et al. |
| 2016/0086700 A1 | 3/2016 | Suetsuna et al. |
| 2016/0086728 A1 | 3/2016 | Suetsuna et al. |
| 2016/0099498 A1 | 4/2016 | Pance et al. |
| 2016/0113113 A1 | 4/2016 | Sethumadhavan et al. |
| 2016/0118171 A1 | 4/2016 | Hill |
| 2016/0276072 A1 | 9/2016 | Sethumadhavan et al. |
| 2017/0098885 A1 | 4/2017 | Hill et al. |
| 2017/0213628 A1 | 7/2017 | Chen et al. |
| 2018/0016157 A1 | 1/2018 | Chen et al. |
| 2019/0013128 A1 | 1/2019 | Chen et al. |
| 2019/0040226 A1 | 2/2019 | Aga et al. |
| 2019/0300379 A1 | 10/2019 | Kojima et al. |
| 2019/0318858 A1 | 10/2019 | Chen et al. |
| 2021/0043346 A1 | 2/2021 | Li et al. |
| 2021/0065943 A1 | 3/2021 | Zhang et al. |
| 2021/0179442 A1 | 6/2021 | Chen et al. |
| 2021/0225566 A1 | 7/2021 | Zhang et al. |
| 2021/0261433 A1 | 8/2021 | Chen et al. |

FOREIGN PATENT DOCUMENTS

| | | | |
|---|---|---|---|
| CN | 103304186 A | 9/2013 | |
| CN | 104193224 A | 12/2014 | |
| DE | 3907220 | 9/1990 | |
| EP | 0884740 A1 | 12/1998 | |
| EP | 0905718 A1 | 3/1999 | |
| EP | 1541641 A1 | 6/2005 | |
| EP | 1652829 A2 | 5/2006 | |
| EP | 2214180 A1 | 8/2010 | |
| EP | 2784044 A1 | 10/2014 | |
| GB | 1105788 A | 3/1968 | |
| JP | 62216922 A | 9/1987 | |
| JP | 01200605 A * | 8/1989 | |
| JP | H09167703 | 6/1997 | |
| JP | H09213513 A | 8/1997 | |
| JP | H09232123 A | 9/1997 | |
| JP | 2000277973 A * | 10/2000 | |
| JP | 2001085210 A * | 3/2001 | |
| JP | 2009155545 A | 7/2009 | |
| JP | 6534418 B2 * | 6/2019 | ......... H01F 1/14775 |
| TW | 201628263 A * | 8/2016 | ........... H01F 1/0551 |
| WO | 2012103020 A2 | 8/2012 | |
| WO | 2016123598 A1 | 8/2016 | |
| WO | 2017068444 | 4/2017 | |
| WO | WO-2017127388 A1 * | 7/2017 | ............. C04B 35/26 |
| WO | WO-2018043943 A1 * | 3/2018 | ........... H01F 1/0315 |

OTHER PUBLICATIONS

Pullar, Robert C. "Hexagonal ferrites: A review of the synthesis, properties and applications of hexaferrite ceramics", Apr. 11, 2012. Progress in Materials Science 57. p. 1191-1230. (Year: 2012).*
International Search Report; International Application No. PCT/US2020/043843; International Filing Date: Jul. 28, 2020;dated Oct. 23, 2020; 5 pages.
Li et al., "High-Frequency Properties and Attenuation Characteristics of WBa Hexaferrite Composites with Doping of Varius Oxides," Transactions of Magnetics, Feb. 2009, pp. 670-677, vol. 45 No. 2.
Morch et al. "Structure and Magnetic properties of W-type hexaferrites," 2019, IUCRJ, pp. 492-499, vol. 6.
Pasko et al. "Magnetic and Structural characterization of nanosized BaCoxZn2-xFe16O27 hexaferrite in the vicinity of spin reorientation transition," 2011, Journal of Physics: Conference Series 303.
Singh et al. "Static Magentic Properties of Co and Ru substituted Ba—Sr ferrite," 2008, Materials Research Bulletin, pp. 176-184, vol. 43.
Written Opinion; International Application No. PCT/US2020/043843; International Filing Date: Jul. 28, 2020;dated Oct. 23, 2020; 9 pages.
Brando et al., "Microwave Electromagnetic Characteristics of New Substituted M-Hexaferrites BaFe12-2xAxMexO19 (A = Ru, Ir; Me = Co, Zn)", Journal De Physique IV France, Mar. 1997.
Jaejin Lee et al: "Role of Small Permeability in Gigahertz Ferrite Antenna Performance", IEEE Magnetics Letters, col. 2, Jan. 1, 2013, pp. 5000104-5000104, XP055241013, USA.
Lee et al. "Figure of merit of X-type hexaferrite (Ba2Co2Fe28O46) for mobile antenna applications", Microwave and Optical Technology Letters, vol. 60, Issue 3, Feb. 5, 2018, https://doi.org/10.1002/mop.31053.
Li et al. "High-frequency magnetic properties of W-type barium-ferrite BaZn2-xCoxFe16O27 composites", Journal of Applied Physics 94, 5918 (2003): https://doi.org/10.1063/1.1618945.
Martin et al; "Flexible Magnetic Composites"; Passive RF Component Technoloby, Materials Techniques and Applications; Chapter 8; 2012; pp. 156-185.
Allia et al.; "Fe3O4 nanoparticles and nanocomposites and potential application in biomedicine and in communication technologies: Nanoparticle aggregation, interaction, and effective magnetic anisotropy"; J. of Applied Physics 116; 113903 (2014) 10 pgs.

(56) References Cited

OTHER PUBLICATIONS

Boix, Rafael R., et al., "Characteristics of Aperture Coupled Microstrip Antennas on Magnetized Ferrite Substrates", IEEE Transactions on Antennas and Propagation, vol. 53, No. 6, (Jun. 1, 2005), pp. 1957-1966.
Brockman et al., Nickel-Zinc Ferrites: I, Effect of Compostion on the Magnetic Properties of a Nickel-Zinc-(Cobalt) Ferrite, Sep. 1970, Journal of the American Ceramic Society, vol. 53, No. 9, pp. 518-520.
Cruz-Montoya et al., "Synthesis and characterization of polymer nanocomposites containing magnetic nanoparticles"; Journal of Applied Physics 107; 09B506 (2010); 4 pgs.
Guo et al. Abstract of "Magnetic Properties of Ir4+ Doped Co2 Z Type Hexagonal Ferrites," Journal of Rare Earths, pp. 220-222, vol. 25, Supplement 2, Jun. 2007; 7 pgs.
Haijun et al., "The preparation and microwave properties of $Ba_3ZnzCo_2-zFe_{24}O_{41}$ ferrite by citrate sol-gel process", Materials Science and Engineering, B84, 2001, pp. 252-257.
Han et al.; "Microwave-absorption properties of Fe(Mn)/ferrite nanocapsules"; J. Phys. D: Appl. Phys. 42; (2009) 5 pages.
Hansen et al., "Antennas with Magneto-Dielectrics", Microwave and Optical Technology Letters, vol. 26, No. 2, Jul. 2000, pp. 75-78.
Huang et al.; "Magnetic epoxy nanocomposites with superparamegnetic $MnFe_2O_4$ nanoparticies"; AIP Advance 5; 097183 (2015); 16 pgs.
International Preliminary Report on Patentability; International Application No. PCT/US2020/041498; International Filing Date Jul. 10, 2020, dated Jan. 27, 2022.
International Search Report for International Application No. PCT/US16/15888, International Filing Date Feb. 1, 2016, dated Jun. 10, 2016, 6 pages.
International Search Report for International Application No. PCT/US2015/055621; International Filing Date Oct. 15, 2015; dated Feb. 3, 2016; 6 pages.
International Search Report for international Application No. PCT/US2016/022800; International Filing Date Mar. 17, 2016; dated Jun. 22, 2016; 6 pages.
International Search Report; International Application No. PCT/US15/043075; International Filing Date Jul. 31, 2015; dated May 31, 2016; 4 pages.
Lee et al. "Role of Small Permeability in Gigahertz Ferrite Antenna Performance," IEEE Magnetics Letter, 2013, vol. 4.
Li et al.; "Microstructure effects on shock-induced surface jetting"; Journal of Applied Physics 115; 073504 (2014); pp. 11.
Liu et al.; "Corrigendum: Electromagnetic-wave-absorption properties of wire-like structures self-assembled by FeCo nanocapsules"; J. Phys. D: Appl. Phys. 45; (2012); 7 pages.
Mou, Fangzhi et al., "Oriented Contraction: A Facile Nonequilibrium Heat-Treatment Approach for Fabrication of Maghemite Fiber-in-Tube and Tube-in-Tube Nanostructures", Langmuir 2010, 26 (19), pp. 15580-15585.
Mu et al., "Improvement of high-frequency characteristics of Z-type hexaferrite by dysprosium doping", Journal of Applied Physics, 109, 123925, 2011, 6 pages.
Pal et al.; "Synthesis and magnetic properties of gold coated iron oxide nanoparticles"; Journal of Applied Physics 105; 07B504 (2009); 4 pgs.
Sahu et al.; "Influence of excess Fe accumulation over the surface of FePt nanoparticles: Structural and magnetic properties"; Journal of Applied Physics 113; 134303 (2013); 1 pg Abstract only.
Sharma et al.; "Ultra Low Loss Soft Magnetic Nanoparticles for Applications Up to S-band," Applied Physics Letters, vol. 103, 112402, Sep. 2013.
Su et el., "Low Loss Factor Co2Z Ferrite Composites with Equivalent Permittivity and Permeability for Ultra-high Frequency Applications," Applied Physics Letters, Aug. 2014, vol. 105 No. 062402.
Thakur et al, "Low-loss Spinel Nanoferrite with Matching Permeability and Permittivity in the Ultrahigh Frequency Range," Journal of Applied Physics • Jul. 2010, vol. 108.
Thanh Ba Do; "High Temperature Composite Materials and Magnetodielectric Composites for Microwave Application"; Dissertation; University of Michigan; 2010; 223 pages.
Written Opinion of the International Search Report for International Application No. PCT/US2015/055621; International Filing Date Oct. 15, 2015; dated Feb. 3, 2016; 15 pages.
Written Opinion of the International Search Report for International Application No. PCT/US2016/022800; International Filing Date Mar. 17, 2016; dated Jun. 22, 2016; 8 pages.
Written Opinion; International Application No. PCT/US15/043075; International Filing Date Jul. 31, 2015; dated May 31, 2016; 5 pages.
Wu et al.; "Studies of high-frequency magnetic permeability of rod-shaped $CrO_2$ nanoparticles"; Phys. Stat. Sol. (a) 204; No. 3; pp. 755-762; 2007.
Xu et al., "Structural, dielectric and magnetic properties of Nd-doped Co2Z-type hexaferrites", Jounal of Alloys and Compounds, 509, 2011, pp. 4290-4294.
Yang, Guo-Min, et al., "Miniaturized Patch Antennas with Ferrite/Dielectric/Ferrite Magnetodielectric Sandwich Substrate", Piers Online, vol. 7, No. 7, (Jan. 1, 2011), pp. 609-612.
Yang, Guo-Min, et al., "Novel Compact and Low-Loss Phase Shifters With Magnetodielectric Disturber", IEEE Microwave and Wireless Components Letters, vol. 21, No. 5, (May 1, 2011); pp. 240-242.
Zaher et al.; "Osmotically driven drug delivery through remote-controlled magnetic nanocomposite membranes" Biomicrofluidics 9; 054113 (2015); 17 pgs.
Ismail et al.; "Magnetic Properties of Mechanically Alloyed Cobalt-Zinc Ferrite Nanoparticles"; J. Supercond Nov Magn; 27; pp. 1293-1298; (2014).
Aoyama et al.; "Preparation and Characterization of Z-type Hexaferrites, $Ba_3(1-x)Sr_{3x}Co_2Fe_{24}O_{41}$ with x=0-0.5, via a two-step calcination with an intermediate wet milling"; J.Electroceram; 17; pp. 61-64 (2006).
Bid et al.; "Microstructure Characterization of Mechanosynthesized Nanocrystalling $NiFe_2O_4$ by Rietveld's Analysis" Physica E 39; pp. 175-184; (2007).
Bierlich et al., "Low-temperature sintering and magnetic properties of Sc- and In-substituted M-type hexagonal barium ferrites for microwave applications", Abstract, Feb. 2017 Materials Research Bulletin 86:19-23 ;11 pages.
Brockman et al. "Nickel-Zinc Ferrite: I, Effect of Composition on the Magnetic Proprties of a Nickel-Zinc-(Cobalt) Ferrite", Journal of the American Ceramic Society, vol. 53, No. 9, Sep. 1, 1970; pp. 517-520.
Cao et al. "Hydrogen-Induced Lateral Growth of Nickel Coating on $Ba_3Co_2Fe_{24}O_4$ ♂ (Co2Z-Based Hexaferrite during the Electroplating of Multilayer Chip Inductors," Journal of The Electrochemical Society, 2002, vol. 149 Issue 12, pp. J89-J92.
Chicinas, I.; "Soft Magnetic Nanocrystalline Powders Produced by Mechanical Alloying Routes"; Journal of Optoelectronics and Advanced Materials; 8(2); pp. 439-448; (2006).
Kim et al., "Effects of In3+ site occupancy on the magnetic properties of M-type strontium hexaferrites", AIB Advances 10, 015040 (2020); https://doi.org/10.1063/1.5130073; 5 pages.
Koch, C. C.; "Materials Synthesis by Mechanical Alloying"; Annu. Rev. MaterSci. 19; pp. 121-143; (1989).
Koch, C.C.; "Intermetallic Matrix Composites Prepared by Mechanical Alloying—a Review"; Materials Science and Engineering; A244; pp. 39-48; (1998).
Kong et al., "Ni—Zn Ferrites Composites With Almost Equal Values of Permeability and Permittivity for Low-Frequency Antenna Design," IEEE Transactions on Magnetics, Jan. 2007, pp. 6-9, vol. 43, No. 1.
Li et al; "Static and Dynamic Magnetic Properties of Co2Z Barium Ferrite Nanoparticle Composites"; Journal of Materials Science, 40, pp. 719-723 (2005).
Mattei et al., "Magnetic and dielectric properties in the UHF frequency band of half-dense Ni—Zn—Co ferrites ceramics with Fe-excess and Fe-deficiency", Journal of Magnetism and Magnetic Materials, Sep. 2017, 8 pages.

(56) References Cited

OTHER PUBLICATIONS

Narayanasamy et al. "Influence of mechanical milling and thermal annealing on electrical and magnetic properties of nanostructured Ni—Zn and cobalt ferrites", Bulletin of Materials Science, vol. 31, No. 3 Jun. 1, 2008; pp. 373-380.

Park et al. "Design of Wide bandwidth microwave absorber with Ferrite composites of broad magenetic loss specturm," Advanced Materials Engineering, 2015.

Pullar, "Hexagonal Ferrites: A Review of the synthesis, properties and application of hexaferrite ceramics," Mar. 2012, Progress in Material Science, vol. 57, No. 7, pp. 1191-1334.

Sahoo et al. Enahnced Magnetoelectricity in Bismuth Substituted $SrFe_{12}O_{19}$ Hexaferrite, Aug. 2019, Journal of Applied Physics, vol. 126, No. 7.

Sepelak et al.; "Nanocrystalline Nickel Ferrite, $NIFe_2O_4$: Mechanosynthesis, Nonequilibrium Cation Distribution, Canted Spin Arrangement, and Magnetic Behavior"; J.Phys.Chem. C; 111; pp. 5026-5033; (2007).

Sepelak et al.,; "Structural and Magnetic Properties of Nanosize Mechanosynthesized Nickel Ferrite"; Jounral of Magnetism and Magnetic Materials; 272-276; pp. 1616-1618; (2004).

Waje et al.; "Sintering Temperature dependence of Room Temperature Magnetic and Dielectric Properties of $Co_{0.5}Zn_{0.5}F_{32}O_4$ Prepared using Mechanically Alloyed Nanoparticles"; Journal of magnetism and Magnetic Materials; 322; pp. 686-691; (2010).

\* cited by examiner

MULTIPHASE FERRITES AND COMPOSITES COMPRISING THE SAME

CROSS-REFERENCE TO RELATED APPLICATION

This application claims the benefit of U.S. Provisional Patent Application Ser. No. 62/880,278 filed Jul. 30, 2019. The related application is incorporated herein in its entirety by reference.

BACKGROUND

Improved performance and miniaturization are needed to meet the ever-increasing demands of devices used in ultra-high frequency (UHF), L-band, and S-band applications, which are of particular interest in a variety of commercial and defense related industries. As an important component in radar and modern wireless communication systems, antenna elements with compact size are constantly being developed. It has been challenging, however, to develop ferrite materials for use in such high frequency applications as most ferrite materials exhibit relatively high magnetic loss at high frequencies. In general, hexagonal ferrites, or hexaferrites, are a type of iron-oxide ceramic compound that has a hexagonal crystal structure and exhibits magnetic properties. Several types of families of hexaferrites are known, including Z-type ferrites, $Ba_3Me_2Fe_{24}O_{41}$, and Y-type ferrites, $Ba_2Me_2Fe_{12}O_{22}$, where Me can be a small 2+ cation such as Co, Ni, or Zn and Sr can be substituted for Ba. Other hexaferrite types include M-type ferrites ((Ba, Sr)$Fe_{12}O_{19}$), W-type ferrites ((Ba, Sr)$Me_2Fe_{16}O_{27}$), X-type ferrites ((Ba, Sr)$_2Me_2Fe_{28}O_{46}$), and U-type ferrites ((Ba, Sr)$_4Me_2Fe_{36}O_{60}$).

Despite these improvements in ferrite composites, their use in high frequency and microwave devices is limited as these substitutions also result in an increase in the magnetic loss. Improved ferrite compositions are therefore desired.

BRIEF SUMMARY

Disclosed herein is a multiphase ferrite.

In an aspect, a multiphase ferrite comprises a $Co_2W$ phase that is optionally doped with Ru; a CFO phase having the formula $Me_r$"$Co_{1-r}Fe_{2+z}O_4$, wherein Me" is at least one of Ni, Zn, or Mg, r is 0 to 0.5, and z is −0.5 to 0.5; and a CoRu-BaM phase having the formula $BaCo_{x+y}Ru_yFe_{12-(2/3)x-2y}O_{19}$, wherein x is 0 to 2, y is 0.01 to 2; and the Ba can be partially replaced by at least one of Sr or Ca.

In another aspect, a composite can comprise a polymer and the multiphase ferrite.

In yet another aspect, an article can comprise the multiphase ferrite or the composite.

In still another aspect, a method of making a multiphase ferrite can comprise mixing and grinding a CoRu-BaM phase ferrite and a CFO phase ferrite to form a mixture; wherein the CoRu-BaM phase ferrite has the formula $BaCo_{x+y}Ru_yFe_{12-(2/3)x-2y}O_{19}$, wherein x is 0 to 2, and y is 0.01 to 2; and sintering the mixture in an oxygen atmosphere to form the multiphase ferrite.

The above described and other features are exemplified by the following figures, detailed description, and claims.

BRIEF DESCRIPTION OF THE DRAWINGS

The following figures are exemplary embodiments, which are provided to illustrate the present disclosure. The figures are illustrative of the examples, which are not intended to limit devices made in accordance with the disclosure to the materials, conditions, or process parameters set forth herein.

DETAILED DESCRIPTION

It was discovered that a composite comprising a multiphase ferrite can achieve a low magnetic loss tangent tan $\delta_\mu$ at high frequencies, for example, up to 6 gigahertz (GHz). The multiphase ferrite comprises a $Co_2W$ phase that is optionally doped with Ru; a CFO phase having the formula $Me_r$"$Co_{1-r}Fe_{2+z}O_4$, wherein Me" is at least one of Ni, Zn, or Mg, r is 0 to 0.5, and z is −0.5 to 0.5; and a CoRu-BaM phase.

The multiphase ferrite can comprise 50 to 95 volume percent, or 60 to 75 volume percent of the $Co_2W$ phase based on the total volume of the multiphase ferrite. The multiphase ferrite can comprise 1 to 20 volume percent, or 5 to 10 volume percent of the CFO phase based on the total volume of the multiphase ferrite. The multiphase ferrite can comprise 5 to 50 volume percent, or 10 to 25 volume percent of the CoRu-BaM phase based on the total volume of the multiphase ferrite. The multiphase ferrite can have an average grain size of 1 to 100 micrometers, or 5 to 50 micrometers. The grain size can be measured using at least one of transmission electron microscopy, field emission scanning electron microscopy, or x-ray diffraction.

The $Co_2W$ phase can have the formula $BaRu_mCo_2Me_nFe_{16-t}O_{27}$, wherein Me can comprise at least one of Ni or Zn, Mg, Co; m is 0 to 1; n is 0 to 2; and t is 0 to 2. It is noted that Me being Co, merely means that the $Co_2W$ phase has an increased amount of Co.

The CoRu-BaM phase can have the formula $BaCo_{x+y}Ru_yFe_{12-(2/3)x-2y}O_{19}$, wherein x is 0 to 2, y is 0.01 to 2; and the Ba can be partially replaced by at least one of Sr or Ca.

A composite can comprise the multiphase ferrite and a polymer. The polymer can comprise a thermoplastic or a thermoset. As used herein, the term "thermoplastic" refers to a material that is plastic or deformable, melts to a liquid when heated, and freezes to a brittle, glassy state when cooled sufficiently. Examples of thermoplastic polymers that can be used include cyclic olefin polymers (including polynorbornenes and copolymers containing norbornenyl units, for example, copolymers of a cyclic polymer such as norbornene and an acyclic olefin such as ethylene or propylene), fluoropolymers (for example, polyvinyl fluoride (PVF), polyvinylidene fluoride (PVDF), fluorinated ethylene-propylene (FEP), polytetrafluoroethylene (PTFE), poly (ethylene-tetrafluoroethylene (PETFE), or perfluoroalkoxy (PFA)), polyacetals (for example, polyoxyethylene and polyoxymethylene), poly($C_{1-6}$ alkyl)acrylates, polyacrylamides (including unsubstituted and mono-N- or di-N-($C_{1-8}$ alkyl)acrylamides), polyacrylonitriles, polyamides (for example, aliphatic polyamides, polyphthalamides, or polyaramides), polyamideimides, polyanhydrides, polyarylene ethers (for example, polyphenylene ethers), polyarylene ether ketones (for example, polyether ether ketones (PEEK)

and polyether ketone ketones (PEKK)), polyarylene ketones, polyarylene sulfides (for example, polyphenylene sulfides (PPS)), polyarylene sulfones (for example, polyethersulfones (PES), polyphenylene sulfones (PPS), and the like), polybenzothiazoles, polybenzoxazoles, polybenzimidazoles, polycarbonates (including homopolycarbonates or polycarbonate copolymers such as polycarbonate-siloxanes, polycarbonate-esters, or polycarbonate-ester-siloxanes), polyesters (for example, polyethylene terephthalates, polybutylene terephthalates, polyarylates, or polyester copolymers such as polyester-ethers), polyetherimides (for example, copolymers such as polyetherimide-siloxane copolymers), polyimides (for example, copolymers such as polyimide-siloxane copolymers), poly($C_{1-6}$ alkyl)methacrylates, polyalkylacrylamides (for example, unsubstituted and mono-N- or di-N-($C_{1-8}$ s alkyl)acrylamides), polyolefins (for example, polyethylenes, such as high density polyethylene (HDPE), low density polyethylene (LDPE), and linear low density polyethylene (LLDPE), polypropylenes, and their halogenated derivatives (such as polytetrafluoroethylenes), and their copolymers, for example, ethylene-alpha-olefin copolymers), polyoxadiazoles, polyoxymethylenes, polyphthalides, polysilazanes, polysiloxanes (silicones), polystyrenes (for example, copolymers such as acrylonitrile-butadiene-styrene (ABS) or methyl methacrylate-butadiene-styrene (MBS)), polysulfides, polysulfonamides, polysulfonates, polysulfones, polythioesters, polytriazines, polyureas, polyurethanes, vinyl polymers (for example, polyvinyl alcohols, polyvinyl esters, polyvinyl ethers, polyvinyl halides (for example, polyvinyl chloride), polyvinyl ketones, polyvinyl nitriles, or polyvinyl thioethers), a paraffin wax, or the like. A combination comprising at least one of the foregoing thermoplastic polymers can be used.

Thermoset polymers are derived from thermosetting monomers or prepolymers (resins) that can irreversibly harden and become insoluble with polymerization or cure, which can be induced by heat or exposure to radiation (for example, ultraviolet light, visible light, infrared light, or electron beam (e-beam) radiation). Thermoset polymers include alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers and copolymers thereof, for example, poly (butadiene-isoprene)), polyisocyanates, polyureas, polyurethanes, triallyl cyanurate polymers, triallyl isocyanurate polymers, certain silicones, and polymerizable prepolymers (for example, prepolymers having ethylenic unsaturation, such as unsaturated polyesters, polyimides), or the like. The prepolymers can be polymerized, copolymerized, or cross-linked, for example, with a reactive monomer such as styrene, alpha-methylstyrene, vinyltoluene, chlorostyrene, acrylic acid, (meth)acrylic acid, a ($C_{1-6}$ alkyl)acrylate, a ($C_{1-6}$ alkyl) methacrylate, acrylonitrile, vinyl acetate, allyl acetate, triallyl cyanurate, triallyl isocyanurate, or acrylamide.

The polymer can comprise at least one of a fluoropolymer, a polyolefin, a polyurethane, a liquid crystalline polymer, a poly(arylene ether ketone), or a poly(phenylene sulfide).

The composite can comprise 10 to 90 volume percent, or 30 to 70 volume percent of the multiphase ferrite based on the total volume of the composite. The composite can comprise 10 to 90 volume percent, or 30 to 70 volume percent of the polymer based on the total volume of the composite.

The composite can have at least one of a high permeability, high operating frequency, a low dielectric loss, or a low magnetic loss, making it suitable for use as an antenna or an inductor at S-L band frequency. The composite can have a permeability of greater than or equal to 1, or greater than or equal to 1.3, or 1 to 2 at a frequency of 1 to 6 gigahertz, or at 3 to 6 gigahertz. The composite can have a magnetic loss tangent tan $\delta_\mu$ of less than or equal to 0.05, less than or equal to 0.02, or 0.02 to 0.05 at a frequency of 1 to 3 gigahertz. The composite can have a magnetic loss tangent tan $\delta_\mu$ of less than or equal to 0.03, or less than or equal to 0.1 at a frequency of 1 to 6 gigahertz, or at 3 to 6 gigahertz. The composite can have a permittivity of 6 to 15, or 8 to 10 at a frequency of 1 to 6 gigahertz, or at 3 to 6 gigahertz. The composite can have a dielectric loss tangent tank of less than or equal to 0.1, or less than or equal to 0.05, less than or equal to 0.01, or less than or equal to 0.006, or 0.006 to 0.05 at a frequency of 1 to 6 gigahertz, or at 3 to 6 gigahertz. The composite can have an operating frequency of 0.1 to 6 gigahertz, or 4 to 6 gigahertz.

As used herein, magnetic and dielectric properties are measured in coaxial airline by vector network analyzer (VNA) using the Nicholson-Ross-Weir (NRW) method and the permeability and permittivity values are the relative permeability and the relative permittivity, respectively.

The multiphase ferrite can be prepared by mixing and grinding a CoRu-BaM phase ferrite and a CFO phase ferrite to form a mixture. The CoRu-BaM phase ferrite can have the formula $BaCo_{x+y}Ru_yFe_{12-(2/3)x-2y}O_{19}$, wherein x is 0 to 2, and y is 0.01 to 2.

The CoRu-BaM phase ferrite can be formed by mixing CoRu-BaM precursor compounds comprising Fe, Ba, Co, and Ru; and sintering the CoRu-BaM precursor compounds in an oxygen atmosphere to form the CoRu-BaM phase ferrite. Sintering of the CoRu-BaM precursor compounds can occur at a CoRu-BaM sintering temperature of 800 to 1,300° C. The sintered CoRu-BaM can be ground to have a median D50 particle size by volume of 0.5 to 10 micrometers.

The CFO phase ferrite can be formed by mixing CFO precursor compounds comprising at least $Fe_2O_3$ and $Co_3O_4$, and sintering the CFO precursor compounds in an oxygen atmosphere to form the CFO phase ferrite. Sintering of the CFO precursor compounds can occur at a CFO sintering temperature of 800 to 1,200° C. The sintered CFO can be ground to have a median D50 particle size by weight of 0.5 to 10 micrometers.

The mixture of the CoRu-BaM phase ferrite and a CFO phase ferrite can comprise 45 to 95 weight percent of the CoRu-BaM phase ferrite based on the total weight of the mixture of the CoRu-BaM phase ferrite and a CFO phase ferrite. The mixture can comprise 5 to 55 weight percent of the CFO phase ferrite, both based on the total weight of the mixture of the CoRu-BaM phase ferrite and a CFO phase ferrite. The mixture can then be sintered in an oxygen atmosphere to form the multiphase ferrite. The sintering can occur at a sintering temperature of 1,000 to 1,300° C., or 1,200 to 1,250° C. The sintering can occur for a sintering time of 1 to 20 hours, or 5 to 12 hours.

The multiphase ferrite can be ground to form a plurality of particulates having a median D50 particle size by weight of 1 to 30 micrometers. The multiphase ferrite can be annealed at 800 to 1,000° C. for 1 to 10 hours in oxygen.

The multiphase ferrite can be mixed with a polymer to form the composite. The mixing can comprise mixing at a temperature of a melting point of the polymer. The mixing can comprise mixing a polymer precursor with the multiphase ferrite and reacting the polymer precursor to form the polymer. Methods of forming the composite are not limited and can comprise injection molding, reaction injection molding, laminating, extruding, compression molding, calendering, casting, and the like. The composite can be free of a void space.

The multiphase ferrite can be surface-treated (also referred to herein as coated) to aid dispersion into the polymer or polymer precursor, for example, with at least one of a surfactant (such as oleylamine oleic acid), an inorganic material (such as $SiO_2$, $Al_2O_3$, and MgO), a silane, a titanate, or a zirconate.

The coating can comprise at least one of a silane coating, a titanate coating, or a zirconate coating. The coating can comprise at least one of phenyltrimethoxysilane, p-chloromethylphenyltrimethoxy silane, aminoethylaminotrimethoxy silane, aminoethylaminopropyltrimethoxy silane, phenyltriethoxysilane, 3,3,3-trifluoropropyl trimethoxysilane, (tridecafluoro-1,1,2,2-tetrahydrodecyl)-1-triethoxysilane, neopentyl(diallyl)oxytrineodecanoyl titanate, neopentyl(diallyl)oxytri(dioctyl)phosphate titanate, neopentyl(diallyl)oxytri(dioctyl)pyrophosphate zirconate, or neopentyl(diallyl)oxytri(N-ethylenediamino)ethyl zirconate. The coating can comprise a silane coating comprising at least one of an aromatic silane such as phenyltrimethoxysilane or a fluorinated aliphatic alkoxy silane such as (tridecafluoro-1,1,2,2-tetrahydrooctyl)triethoxy silane.

The multiphase ferrite can be pretreated with the coating agent prior to forming the composite mixture, or the coating agent can be added to the composite mixture prior to forming the composite. The coating can be present in an amount of 0.2 to 4 wt %, or 1 to 3 wt % based on the total weight of the multiphase ferrite.

An article can comprise the composite. The article can be an antenna or an inductor core. The article can be for use in the frequency 0.1 to 4 gigahertz range, or in the 0.5 to 2 gigahertz range. The article can be used for a variety of devices operable within the ultrahigh frequency range, such as a high frequency or microwave antenna, filter, inductor, circulator, or phase shifter. The article can be operable at frequencies greater than or equal to 1 GHz, or at frequencies of 1 to 6 GHz. Such articles can be used in commercial and military applications, weather radar, scientific communications, wireless communications, autonomous vehicles, aircraft communications, space communications, satellite communications, or surveillance.

The multiphase ferrite can comprise a $Co_2W$ phase that is optionally doped with Ru; a CFO phase having the formula $Me_r"Co_{1-r}Fe_{2+z}O_4$, wherein Me" is at least one of Ni, Zn, or Mg, r is 0 to 0.5, and z is −0.5 to 0.5; and a CoRu-BaM phase having the formula $BaCo_{x+y}Ru_yFe_{12-(2/3)x-2y}O_{19}$, wherein x is 0 to 2, y is 0.01 to 2; and the Ba can be partially replaced by at least one of Sr or Ca. The multiphase ferrite can comprise 50 to 95 volume percent of the $Co_2W$ phase; 1 to 20 volume percent of the CFO phase; and 5 to 50 volume percent of the CoRu-BaM phase; all based on the total volume of the multiphase ferrite. The $Co_2W$ phase can comprise Ru. A composite can comprise the multiphase ferrite. The composite can comprise 10 to 90 volume percent of the multiphase ferrite; and 10 to 90 volume percent of the polymer; both based on the total volume of the composite. The polymer can comprise at least one of a fluoropolymer, a polyolefin, a polyurethane, a liquid crystalline polymer, a poly(arylene ether ketone), or a poly(phenylene sulfide). The composite can have at least one of: a permeability of greater than or equal to 1 at a frequency of 1 to 6 gigahertz; a permittivity of 6 to 15 at a frequency of 1 to 6 gigahertz; a magnetic loss tangent tan % of less than or equal to 0.1, or less than or equal to 0.03 at a frequency of 1 to 6 gigahertz; a dielectric loss tangent tan $δ_ε$ of less than or equal to 0.05, or less than or equal to 0.01 at a frequency of 1 to 6 gigahertz. An article can comprise the multiphase ferrite or the composite. The article can be an antenna, filter, inductor, circulator, or phase shifter. The article can be a microwave antenna. The antenna can be operable at a frequency of greater than or equal to 0.1 gigahertz, or greater than or equal to 0.3 gigahertz, or 0.1 to 6 gigahertz.

A method of making the multiphase ferrite can comprise mixing and grinding a CoRu-BaM phase ferrite and a CFO phase ferrite to form a mixture; and sintering the mixture in an oxygen atmosphere to form the multiphase ferrite. The method can comprise grinding the multiphase ferrite to form a plurality of particulates having a median particle size (D50) by volume of 1 to 50 micrometers and annealing the plurality of particulates at 800 to 1,000° C. for 1 to 10 hours in oxygen. The sintering can occur at a sintering temperature of 1,000 to 1,300° C., or 1,200 to 1,250° C. The sintering can occur for a sintering time of 1 to 20 hours, or 5 to 12 hours. The method can further comprise forming the CoRu-BaM phase ferrite prior to the mixing; wherein the forming comprises mixing CoRu-BaM precursor compounds comprising Fe, Ba, Co, and Ru; and sintering the CoRu-BaM precursor compounds in an oxygen atmosphere to form the CoRu-BaM phase ferrite. The method can further comprise forming the CFO phase ferrite prior to the mixing; wherein the forming comprises mixing CFO precursor compounds comprising Fe and Co; and sintering the CFO precursor compounds in an oxygen atmosphere to form the CFO phase ferrite. The mixture can comprise 45 to 95 weight percent of the CoRu-BaM phase ferrite and a 5 to 55 weight percent of the CFO phase ferrite, both based on the total weight of the mixture of the two ferrites. A composite can be formed by mixing the multiphase ferrite with a polymer.

The following examples are provided to illustrate the present disclosure. The examples are merely illustrative and are not intended to limit devices made in accordance with the disclosure to the materials, conditions, or process parameters set forth therein.

EXAMPLES

In the examples, the magnetic permeability of the resulting ferrite samples was measured in coaxial airline by vector network analyzer (VNA) using the Nicholson-Ross-Weir (NRW) method over a frequency of 0.1 to 10 GHz.

The particle sizes were determined using Horiba LA-910 laser light scattering PSD analyzer or as determined in accordance with ASTM D4464-15. The reported particle size is the median D50 particle size by volume.

Example 1

Preparation of a CoRu-BaM Phase Ferrite

Two samples of the CoRu-BaM phase ferrite were formed by mixing appropriate amounts of $BaCO_3$, $Co_3O_4$, $Fe_2O_3$, and $RuO_2$ in a wet planetary mill to form a mixture. The mixtures were sintered at a temperature of 1,200° C. for a soak time of 4 hours in air. The sintered mixtures were crushed and ground to form particulates having a median particle size of 1 to 2 micrometers in a wet planetary mill. The CoRu-BaM phase ferrites had formulae BaCo$_{0.5}$Ru$_{0.2}$Fe$_{11.4}$O$_{19}$ and BaCo$_{0.2}$Ru$_{0.2}$Fe$_{11.6}$O$_{19}$, respectively.

Example 2

Preparation of a CFO Phase Ferrite

A CFO phase ferrite was formed by mixing appropriate amounts of Co$_3$O$_4$Fe$_2$O$_3$ in a wet planetary mill to form a mixture. The mixture was sintered at a temperature of 900° C. for a soak time of 4 hours in air. The sintered mixture was crushed and ground form particulates having a median particle size of 1 to 2 micrometers in a wet planetary mill.

Examples 3-4

Preparation of a Multiphase Ferrite

The CoRu-BaM phase ferrite of Example 1 and CFO phase ferrite of Example 2 were mixed in accordance with Table 1 and ground in a planetary ball mill to form a mixture of the two ferrites. The mixture was sintered at 1,260° C. for 10 hours in an oxygen atmosphere to form the multiphase ferrites. The flow rate of oxygen was 0.1 to 2 L/min and the ramping for the temperature was 1 to 5° C./min. The sintered mixture was found to form particulates having a median particle size of 10 to 20 micrometers. The particulates were post-annealed at 900° C. for three hours in an oxygen atmosphere.

TABLE 1

| Example | 3 | 4 |
|---|---|---|
| BaCo$_{0.5}$Ru$_{0.2}$Fe$_{11.4}$O$_{19}$ (vol %) | 83.3 | — |
| BaCo$_{0.2}$Ru$_{0.2}$Fe$_{11.6}$O$_{19}$ (vol %) | — | 55 |
| CoFe$_2$O$_4$ (vol %) | 16.7 | 45 |

Figure 1:
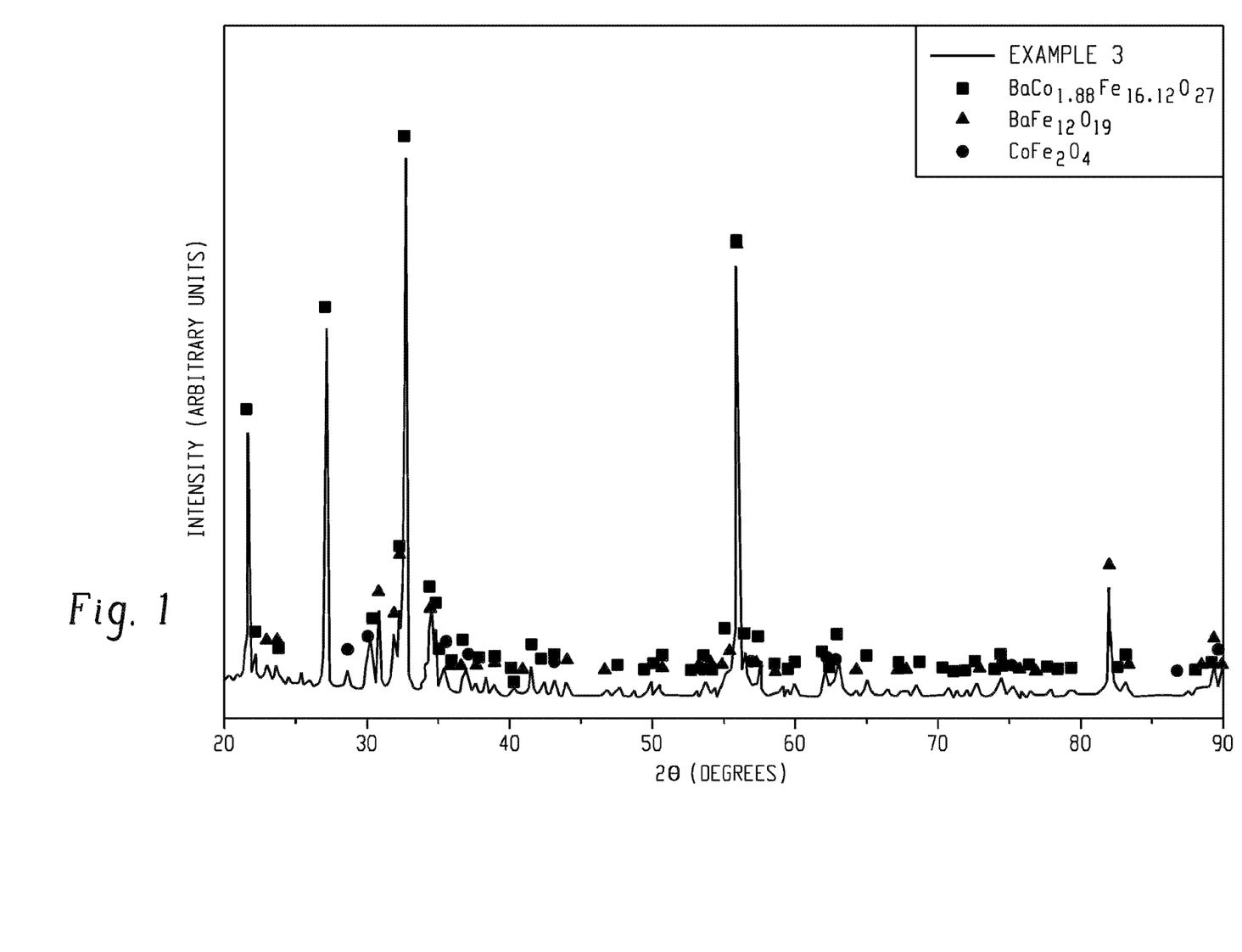
FIG. 1 is a graphical illustration of the x-ray diffraction data for Example 3.
Figure 2:
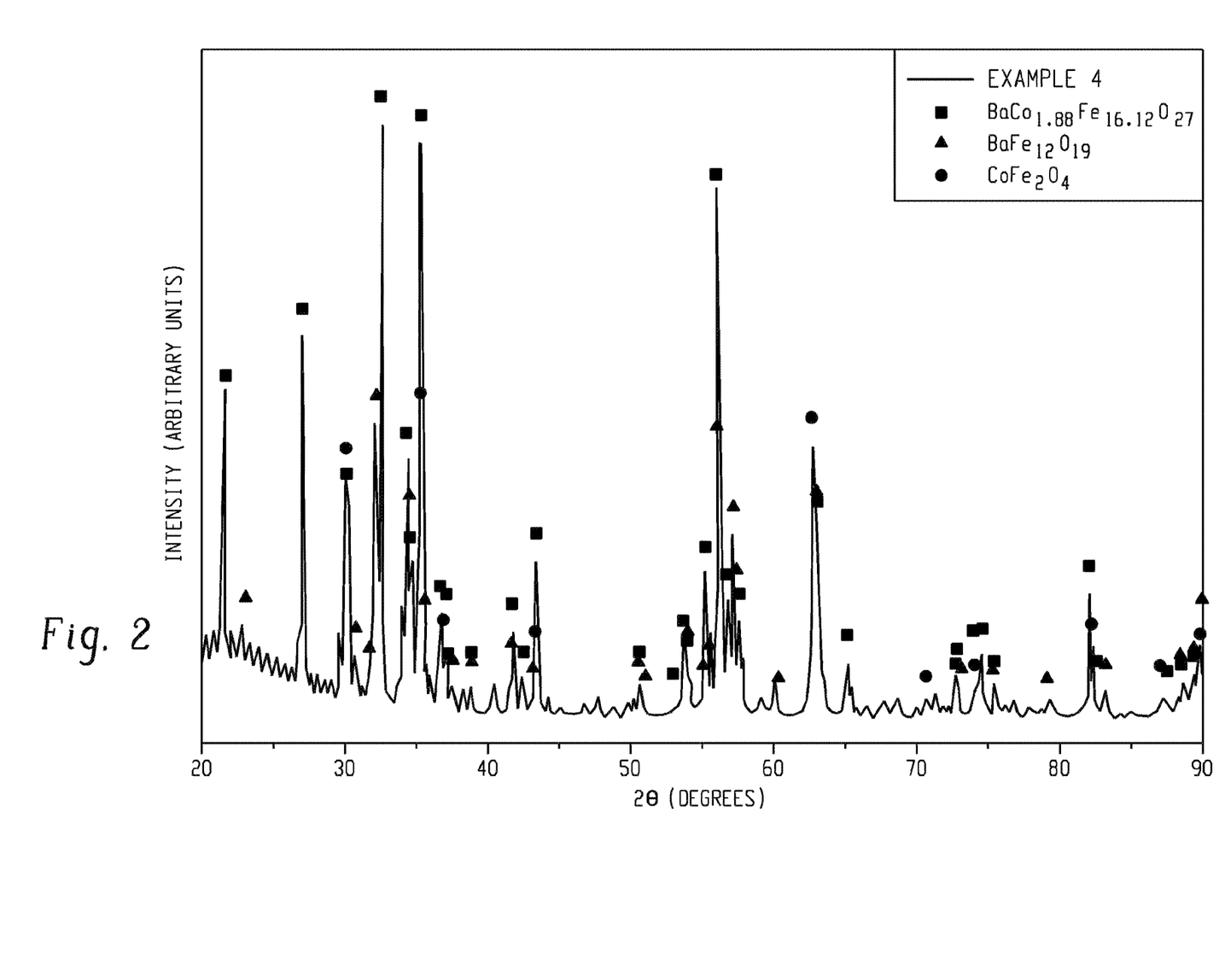
FIG. 2 is a graphical illustration of the x-ray diffraction data for Example 4.

The particulates of Example 3 and Example 4 were analyzed using X-ray diffraction and the results are shown in FIG. 1 and FIG. 2, respectively. In these figures, the peaks identified with the squares indicate the presence of the Co$_2$W phase, the peaks identified with the triangles indicate the presence of the CoRu-BaM phase, and the peaks identified with the circles indicate the presence of the CFO phase ferrite. FIG. 1 and FIG. 2 clearly show the presence of the three phases in the multiphase ferrites of Example 3 and Example 4, respectively.

Examples 5-6

Preparation of a Multiphase Ferrite Composite

Composite samples were formed by mixing 60 vol % of the multiphase ferrite of Example 3 or Example 4 and 40 vol % of a paraffin to form the composites of Examples 5 and 6, respectively. The composites were then molded to form toroids and the resultant properties were measured. The permeability and magnetic loss tangent tan $\delta_{\mu}$ Examples 5 and 6 are shown in FIG. 3 and the permittivity and dielectric loss tangent tan $\delta_\varepsilon$ of Examples 5 and 6 are shown in FIG. 4 and values of both Example 5 and Example 6 are shown in Table 2.

TABLE 2

| | Example | | | | | | | |
|---|---|---|---|---|---|---|---|---|
| | 5 | | | | 6 | | | |
| f(GHz) | μ' | tan$\delta_\mu$ | ε' | tan$\delta_\varepsilon$ | μ' | tan$\delta_\mu$ | ε' | tan$\delta_\varepsilon$ |
| 1 | 1.71 | 0.033 | 9.25 | 0.013 | 1.45 | 0.065 | 8.13 | 0.009 |
| 1.6 | 1.72 | 0.043 | 9.26 | 0.013 | 1.45 | 0.067 | 8.12 | 0.008 |
| 2 | 1.72 | 0.044 | 9.28 | 0.014 | 1.44 | 0.066 | 8.12 | 0.010 |
| 3 | 1.70 | 0.048 | 9.30 | 0.021 | 1.40 | 0.075 | 8.12 | 0.011 |
| 4 | 1.70 | 0.061 | 9.30 | 0.030 | 1.38 | 0.068 | 8.14 | 0.014 |
| 5 | 1.68 | 0.075 | 9.31 | 0.037 | 1.38 | 0.067 | 8.15 | 0.019 |
| 6 | 1.68 | 0.091 | 9.32 | 0.045 | 1.38 | 0.069 | 8.15 | 0.023 |
| 7 | 1.65 | 0.103 | 9.33 | 0.055 | 1.38 | 0.076 | 8.17 | 0.025 |

Figure 3:
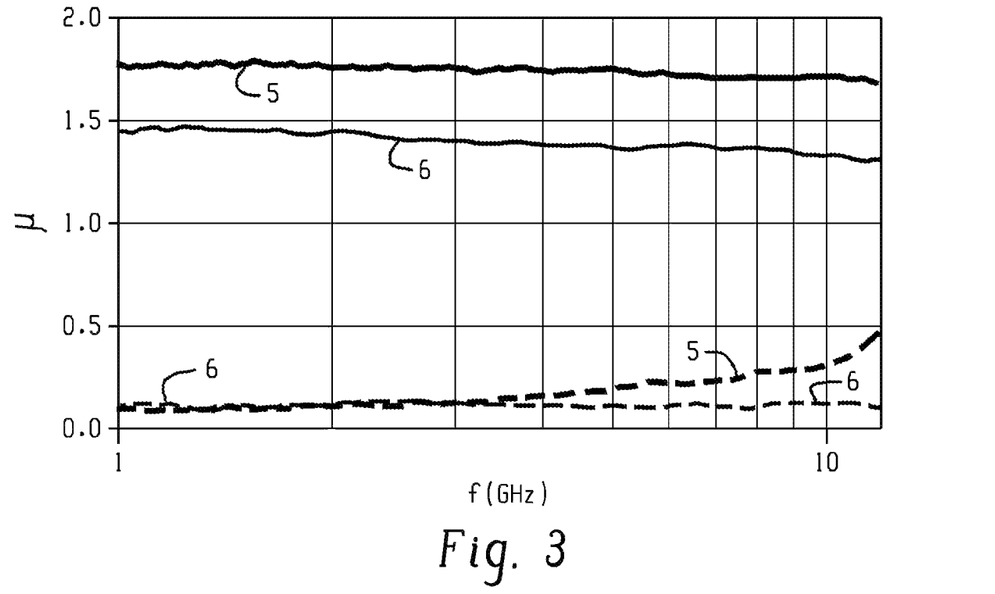
FIG. 3 is a graphical illustration of the permeability and magnetic loss tangent with frequency for Examples 5 and 6 of ferrite-polymer composites.
Figure 4:
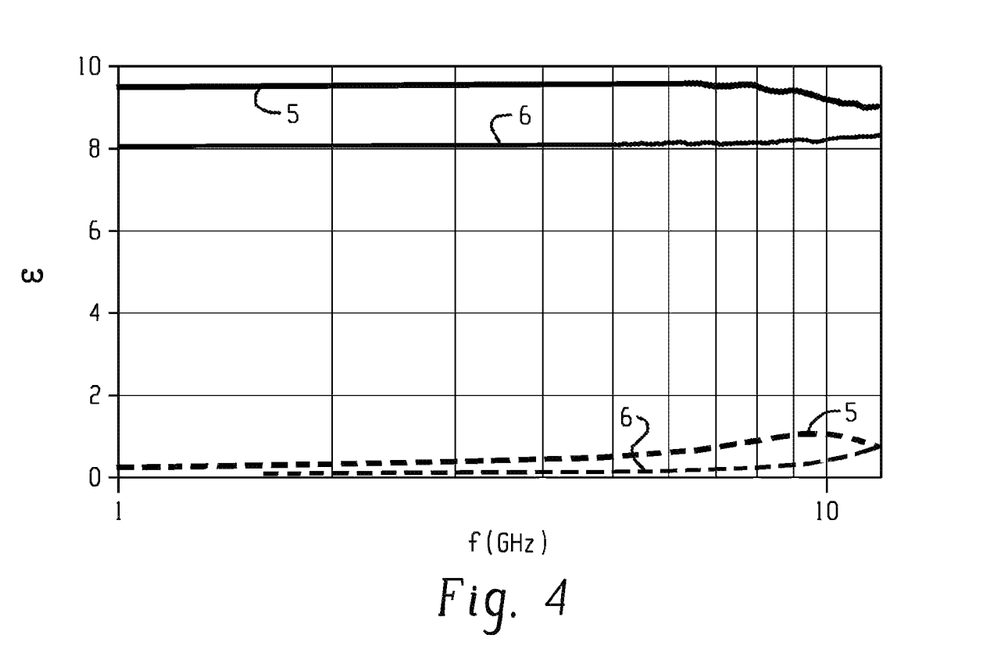
FIG. 4 is a graphical illustration of the permittivity and dielectric loss tangent with frequency for Examples 5 and 6 of ferrite-polymer composites.

FIG. 3 and FIG. 4 illustrate the low magnetic loss tangent values for both Example 5 and Example 6 over a broad frequency range, remaining below 0.1 up to 6 gigahertz, while also exhibiting good permeability, permittivity, and dielectric loss values over the frequency range.

Set forth below are non-limiting aspects of the present disclosure.

Aspect 1: A multiphase ferrite comprising: a Co$_2$W phase that is optionally doped with Ru; a CFO phase having the formula Me$_r$"Co$_{1-r}$Fe$_{2+z}$O$_4$, wherein "Me" is at least one of Ni, Zn, or Mg, r is 0 to 0.5, and z is −0.5 to 6 0.5; and a CoRu-BaM phase having the formula BaCo$_{x+y}$Ru$_y$Fe$_{12-(2/3)x-2y}$O$_{19}$, wherein x is 0 to 2, y is 0.01 to 2; and the Ba can be partially replaced by at least one of Sr or Ca.

Aspect 2: The multiphase ferrite of Aspect 1, wherein the multiphase ferrite comprises: 50 to 95 volume percent of the Co$_2$W phase; 1 to 20 volume percent of the CFO phase; and 5 to 50 volume percent of the CoRu-BaM phase; all based on the total volume of the multiphase ferrite.

Aspect 3: The multiphase ferrite of any one or more of the preceding aspects, wherein the Co$_2$W phase comprises Ru.

Aspect 4: A composite comprising: the multiphase ferrite of any one or more of the preceding aspects; and a polymer.

Aspect 5: The composite of Aspect 4, wherein the composite comprises: 10 to 90 volume percent of the multiphase ferrite; and 10 to 90 volume percent of the polymer; both based on the total volume of the composite.

Aspect 6: The composite of any one or more of Aspects 4 to 5, wherein the polymer comprises at least one of a fluoropolymer, a polyolefin, a polyurethane, a liquid crystalline polymer, a poly(arylene ether ketone), or a poly(phenylene sulfide).

Aspect 7: The composite of any one or more of Aspects 4 to 6, wherein the composite has at least one of: a permeability of greater than or equal to 1 at a frequency of 1 to 6 gigahertz; a permittivity of 6 to 15 at a frequency of 1 to 6 gigahertz; a magnetic loss tangent tan $\delta_\mu$ of less than or equal to 0.1, or less than or equal to 0.03 at a frequency of 1 to 6 gigahertz; a dielectric loss tangent tank of less than or equal to 0.05, or less than or equal to 0.01 at a frequency of 1 to 6 gigahertz.

Aspect 8: An article comprising the multiphase ferrite of any one or more of Aspects 1 to 3 or the composite of any one or more of Aspects 4 to 7.

Aspect 9: The article of Aspect 8, wherein the article is an antenna, filter, inductor, circulator, or phase shifter.

Aspect 10: The article of any one or more of Aspects 8 to 9, wherein the article is a microwave antenna.

Aspect 11: The article of any one or more of Aspects 8 to 10, wherein the article is an antenna operable at a frequency of greater than or equal to 0.1 gigahertz, or greater than or equal to 0.3 gigahertz, or 0.1 to 6 gigahertz.

Aspect 12: A method of making a multiphase ferrite, for example, of any one or more of Aspect 1 to 3 comprising: mixing and grinding a CoRu-BaM phase ferrite and a CFO phase ferrite to form a mixture; wherein the CoRu-BaM phase ferrite has the formula $BaCo_{x+y}Ru_yFe_{12-(2/3)x-2y}O_{19}$, wherein x is 0 to 2, and y is 0.01 to 2; and sintering the mixture in an oxygen atmosphere to form the multiphase ferrite.

Aspect 13: The method of Aspect 12, further comprising grinding the multiphase ferrite to form a plurality of particulates having a median particle size (D50) by weight of 1 to 50 micrometers and annealing the plurality of particulates at 800 to 1,000° C. for 1 to 10 hours in oxygen.

Aspect 14: The method of any one or more of Aspects 12 to 13, wherein the sintering occurs at a sintering temperature of 1,000 to 1,300° C., or 1,200 to 1,250° C. for a sintering time of 1 to 20 hours, or 5 to 12 hours.

Aspect 15: The method of any one or more of Aspects 12 to 14, further comprising forming the CoRu-BaM phase ferrite prior to the mixing; wherein the forming comprises mixing CoRu-BaM precursor compounds comprising Fe, Ba, Co, and Ru; and sintering the CoRu-BaM precursor compounds in an oxygen atmosphere to form the CoRu-BaM phase ferrite.

Aspect 16: The method of any one or more of Aspects 12 to 15, further comprising forming the CFO phase ferrite prior to the mixing; wherein the forming comprises mixing CFO precursor compounds comprising Fe and Co; and sintering the CFO precursor compounds in an oxygen atmosphere to form the CFO phase ferrite.

Aspect 17: The method of any one or more of Aspects 12 to 16, wherein the mixture comprises 45 to 95 weight percent of the CoRu-BaM phase ferrite and a 5 to 55 weight percent of the CFO phase ferrite, both based on the total weight of the mixture.

Aspect 18: The method of any one or more of Aspects 12 to 17, further comprising mixing the multiphase ferrite with a polymer to form the composite of any one or more of Aspects 4 to 7.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named The term "or" means "and/or" unless clearly indicated otherwise by context. Reference throughout the specification to "an aspect", "another aspect", "some aspects", and so forth, means that a particular element (e.g., feature, structure, step, or characteristic) described in connection with the aspect is included in at least one aspect described herein, and may or may not be present in other aspect. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 vol %, or 5 to 20 vol %" is inclusive of the endpoints and all intermediate values of the ranges of "5 to 25 vol %," such as 10 to 23 vol %, etc.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A multiphase ferrite comprising:
   a $Co_2W$ phase that optionally comprises Ru;
   a CFO phase having a formula $Me''_rCo_{1-r}Fe_{2+z}O_4$, wherein Me" is at least one of Ni, Zn, or Mg, r is 0 to 0.5, and z is −0.5 to 0.5; and
   a CoRu-BaM phase having a formula $BaCo_{x+y}Ru_yFe_{12-(2/3)x-2y}O_{19}$, wherein x is 0 to 2, y is 0.01 to 2; and the Ba is optionally partially replaced by at least one of Sr or Ca.

2. The multiphase ferrite of claim 1, wherein the multiphase ferrite comprises:
   50 to 95 volume percent of the $Co_2W$ phase;
   1 to 20 volume percent of the CFO phase; and
   5 to 50 volume percent of the CoRu-BaM phase;
   all based on a total volume of the multiphase ferrite.

3. The multiphase ferrite of claim 1, wherein the $Co_2W$ phase comprises Ru.

4. The multiphase ferrite of claim 3, wherein the $Co_2W$ phase has the formula $BaRu_mCo_2Me_nFe_{16-t}O_{27}$, wherein Me comprises at least one of Ni, Zn, Mg, or Co; m is 0 to 1; n is 0 to 2; and t is 0 to 2; or wherein the $Co_2W$ phase has the formula $BaCo_{1.88}Fe_{16.12}O_{27}$.

5. The multiphase ferrite of claim 1, wherein the Ba is partially replaced by at least one of Sr or Ca.

6. A composite comprising:
   a multiphase ferrite; and
   a polymer;
   wherein the multiphase ferrite has
   a $Co_2W$ phase that is optionally doped with Ru;
   a CFO phase having a formula $Me''_rCo_{1-r}Fe_{2+z}O_4$, wherein Me" is at least one of Ni, Zn, or Mg, r is 0 to 0.5, and z is −0.5 to 0.5; and a CoRu-BaM phase having a formula $BaCo_{x+y}Ru_yFe_{12-(2/3)x-2y}O_{19}$, wherein x is 0 to 2, y is 0.01 to 2; and the Ba is optionally partially replaced by at least one of Sr or Ca.

7. The composite of claim 6, wherein the composite comprises:
10 to 90 volume percent of the multiphase ferrite; and
10 to 90 volume percent of the polymer;
both based on a total volume of the composite.

8. The composite of claim 6, wherein the polymer comprises at least one of a fluoropolymer, a polyolefin, a polyurethane, a liquid crystalline polymer, a poly(arylene ether ketone), or a poly(phenylene sulfide).

9. The composite of claim 6, wherein the composite has at least one of:
a permeability of greater than or equal to 1 at a frequency of 1 to 6 gigahertz;
a permittivity of 6 to 15 at a frequency of 1 to 6 gigahertz;
a magnetic loss tangent tan % of less than or equal to 0.1 at a frequency of 1 to 6 gigahertz; or
a dielectric loss tangent tank of less than or equal to 0.05 at a frequency of 1 to 6 gigahertz.

10. An article comprising the multiphase ferrite of claim 1.

11. The article of claim 10, wherein the article is an antenna, filter, inductor, circulator, or phase shifter.

12. The article of claim 10, wherein the article is a microwave antenna.

13. The article of claim 10, wherein the article is an antenna operable at a frequency of greater than or equal to 0.1 gigahertz.

14. A method of making the multiphase ferrite of claim 1, comprising:
mixing and grinding a CoRu-BaM phase ferrite and a CFO phase ferrite to form a mixture; wherein the CoRu-BaM phase ferrite has a formula $BaCo_{x+y}Ru_yFe_{12-(2/3)x-2y}O_{19}$, wherein x is 0 to 2, and y is 0.01 to 2; and
sintering the mixture in an oxygen atmosphere to form the multiphase ferrite.

15. The method of claim 14, further comprising grinding the multiphase ferrite to form a plurality of particulates having a median particle size (D50) by volume of 1 to 50 micrometers and annealing the plurality of particulates at 800 to 1,000° C. for 1 to 10 hours in oxygen.

16. The method of claim 14, wherein the sintering occurs at a sintering temperature of 1,000 to 1,300° C., or 1,200 to 1,250° C. for a sintering time of 1 to 20 hours, or 5 to 12 hours.

17. The method of claim 14, further comprising forming the CoRu-BaM phase ferrite prior to the mixing; wherein the forming comprises mixing CoRu-BaM precursor compounds comprising Fe, Ba, Co, and Ru; and sintering the CoRu-BaM precursor compounds in an oxygen atmosphere to form the CoRu-BaM phase ferrite.

18. The method of claim 14, further comprising forming the CFO phase ferrite prior to the mixing; wherein the forming comprises mixing CFO precursor compounds comprising Fe and Co; and sintering the CFO precursor compounds in an oxygen atmosphere to form the CFO phase ferrite.

19. The method of claim 14, wherein the mixture comprises 45 to 95 weight percent of the CoRu-BaM phase ferrite and a 5 to 55 weight percent of the CFO phase ferrite, both based on the a weight of the mixture.

20. The method of claim 14, further comprising mixing the multiphase ferrite with a polymer to form a composite.

\* \* \* \* \*